United States Patent
Kirschner

(10) Patent No.: US 12,233,730 B2
(45) Date of Patent: Feb. 25, 2025

(54) MODULAR EXTERNAL AC CHARGER

(71) Applicant: AUDI AG, Ingolstadt (DE)

(72) Inventor: Sebastian Kirschner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 237 days.

(21) Appl. No.: 17/321,111

(22) Filed: May 14, 2021

(65) Prior Publication Data

US 2021/0354578 A1  Nov. 18, 2021

(30) Foreign Application Priority Data

May 15, 2020 (DE) .......................... 102020113210.7

(51) Int. Cl.
  *B60L 53/30* (2019.01)
  *H02J 7/00* (2006.01)
  *H02J 7/04* (2006.01)

(52) U.S. Cl.
  CPC .......... *B60L 53/30* (2019.02); *H02J 7/00032* (2020.01); *H02J 7/0045* (2013.01); *H02J 7/04* (2013.01); *H02J 2207/20* (2020.01)

(58) Field of Classification Search
  CPC ... B60L 53/30; B60L 58/10; H02J 7/04; H02J 7/0045; H02J 7/022; H02J 2207/20
  See application file for complete search history.

(56) References Cited

U.S. PATENT DOCUMENTS

| | | | | |
|---|---|---|---|---|
| 8,447,435 | B1 * | 5/2013 | Miller | H02J 3/06 700/297 |
| 2004/0189251 | A1 | 9/2004 | Kutkut et al. | |
| 2011/0055037 | A1 * | 3/2011 | Hayashigawa | B60L 53/16 705/26.1 |
| 2012/0299531 | A1 | 11/2012 | Prosser et al. | |
| 2012/0303213 | A1 * | 11/2012 | Prosser | B60L 53/305 320/107 |
| 2013/0257346 | A1 * | 10/2013 | Jakins | H02J 7/35 320/107 |
| 2019/0103805 | A1 * | 4/2019 | Zhu | H02J 7/0063 |

FOREIGN PATENT DOCUMENTS

| | | | | |
|---|---|---|---|---|
| DE | 102015200960 A1 * | 7/2016 | | B60L 11/1812 |
| DE | 10 2015 200 960 B4 | 5/2018 | | |
| DE | 10 2017 130 497 A1 | 6/2019 | | |
| DE | 10 2019 124 628 A1 | 3/2020 | | |
| EP | 2 492 133 A2 | 8/2012 | | |
| EP | 2841294 A1 * | 3/2015 | | B60L 11/185 |
| EP | 2841294 B1 * | 7/2019 | | B60L 11/185 |

* cited by examiner

*Primary Examiner* — Richard Isla
*Assistant Examiner* — Sadia Kousar
(74) *Attorney, Agent, or Firm* — Seed IP Law Group LLP

(57) ABSTRACT

A portable modular external AC charger and an AC charging system for a high-voltage battery of an electric or hybrid motor vehicle, may allow charging performance and range of functions to be adapted as desired.

16 Claims, 3 Drawing Sheets

MODULAR EXTERNAL AC CHARGER

BACKGROUND

Technical Field

Embodiments of the present invention relate to a portable modular external AC charger and an AC charging system for a high-voltage (HV) battery of an electric or hybrid motor vehicle, the charging performance and range of functions of which can be adapted as desired.

Description of the Related Art

Present-day electric and hybrid vehicles have a fixed charging device built into the vehicle for the charging of their HV batteries with alternating current, the so-called On-Board Charger (OBC). A connection cable serves for the connection and communication of the built-in charging device with the alternating current source, such as a plug receptacle or an alternating current charging column (AC charging column). The built-in charging device requires design space and increases the overall weight of the motor vehicle and its production costs. Moreover, the built-in charging device has a fixed maximum charging performance and a range of functions depending on the hardware used. Therefore, it has already been proposed to replace the built-in charging device with an external charging device whose charging performance can be varied.

There is known from EP 2 492 133 A2 a universal stationary charging device, comprising at least one charging pack having an alternating current terminal for supplying an alternating current power, an AC/DC converter for rectifying the alternating current power to a direct current power, a direct current terminal for putting out a direct current power having a first power value and a charging pack switch for switching on and off an output of the direct current supply. It is possible to put out a direct current power having different power values in dependence on the installed number of charging packs and depending on whether each charging pack switch is switched on or off, and a charging rate of an electric vehicle can be adjusted in dependence on the changes in the power value of the direct current supply.

US 2004 0 189 251 A1 discloses a modular and reconfigurable stationary charging system, comprising modular power stages which are configured such that they provide an alternating current input (AC) and a direct current output (DC) for charging a battery.

These modular power stages include an inverter, which is coupled to a rectifier circuit that puts out a battery charging current.

US 2012 0 299 531 A1 relates to a breakdown assistance vehicle which is outfitted with modular battery packs and a charging system for a HV battery of a stalled motor vehicle.

DE 10 2015 200 960 B4 proposes an external charger having multiple power modules for transforming of alternating current (AC) into direct current (DC). At least one of the power modules can be taken out, electrically and mechanically decoupled from the charger, and used as a separate charging device.

BRIEF SUMMARY

The present disclosure makes available an AC charger and an AC charging system for a HV battery of an electric or hybrid motor vehicle which can save on weight and design space in the vehicle and whose charging performance and range of functions can be adapted as desired.

The subject matter of the present disclosure is a portable external alternating current charger for a HV battery of an electric or hybrid motor vehicle, having a modular design. The charger comprises a basic module and optionally one or more accessory modules, which are mechanically and electrically connected to each other by releasable plug connections. The basic module comprises an alternating current input, a direct current output, a data interface, an alternating current output and a direct current input.

In the context of the present application, by a portable charger is meant a charger which is not anchored in a fixed location, such as a charging column or a wall box, and one whose dimensions and weight allow it to be carried along in the trunk space of a vehicle, for example. By an external charger is meant a charger which is not built into the vehicle in fixed manner, but instead one which is connected from the outside to a charging socket of the vehicle during the charging process. By an alternating current charger is meant a charger which uses an alternating current source as its energy source, such as the electricity grid.

The charger comprises a basic module and optionally one or more accessory modules. In one embodiment, the charger comprises only the basic module. In another embodiment, the charger comprises the basic module and at least one accessory module. In a further embodiment, the charger comprises more than one accessory module, such as two accessory modules, three accessory modules, or four accessory modules. The accessory modules can be electrically and mechanically coupled to the basic module and/or further accessory modules.

The basic module comprises an alternating current input, a direct current output, a data interface, an alternating current output and a direct current input. In one embodiment, the basic module additionally comprises a further data interface, a further alternating current input and a further direct current output. This embodiment may also be used as an OBC in the motor vehicle. For this, additional terminals bring about the contacting and integration directly in the onboard high voltage network of the vehicle. If needed, the AC charger can be carried along in the vehicle and be connected to the onboard vehicle network (such as by using a plug connection), so that the charger is again a component of the onboard vehicle network and the HV battery can also be charged with alternating current en route.

In one embodiment, the charger comprises at least one accessory module. The at least one accessory module comprises an alternating current input, a direct current output, a first data interface, a direct current input, an alternating current output and a second data interface.

In one embodiment, at least one accessory module of the charger comprises a rectifier. Thanks to the modular design, the charger can be expanded according to the required AC charging performance. For example, if the basic module has a charging performance of up to 11 kW, one or more power modules can be adapted to boost or multiply the charging performance according to the needs, the individual charging behavior, and the charging infrastructure. The charger may comprise multiple power modules, such as two or three. Thanks to the use of multiple power modules, the charging performance can be enhanced until an optimal charging behavior is achieved, as is possible with the latest available charging devices. Thanks to the use of multiple power modules, at the same time the efficiency and the power density can also be improved. In this way, an efficiency of more than 97% can be achieved, so that the HV battery can be charged to more than 80% in the shortest time. Thanks to the use of multiple power modules, furthermore, the flexibility of the charger can be assured, in order to make possible different charging performance with the same charger.

The power modules may be designed as semiconductor modules, for example, which may have a high clock frequency. In this way, the filter expense on the grid and battery side can be reduced, so that the power density of the complete charger can be increased. The charger can have a simple and especially a compact design, thanks to the use of power modules, especially semiconductor modules.

In one embodiment, at least one accessory module of the charger comprises a high-voltage battery (HV battery). The HV battery serves as a "power bank" and thus allows the charger to function as an emergency power supply for the vehicle.

In addition, further modules can be contacted, which expand the range of functions of the charging unit, e.g., it is possible to adapt one function module in order to integrate new intelligent charging functions having a hardware dependency in an existing vehicle. In one embodiment of the charger, at least one accessory module comprises a connectivity module for intelligent charging functions.

In one embodiment, the charger is a three-phase charger. A three-phase charger can achieve a higher charging performance than known single-phase chargers. The enhanced charging performance of the charger allows a rapid charging of the HV battery. In another embodiment, the charger is a single-phase charger. A single-phase charger affords the advantage that it can be connected to any household plug receptacle and it requires less componentry than a three-phase charger.

The subject matter of the present disclosure is also a charging system for a HV battery of an electric or hybrid motor vehicle. The charging system comprises a charger as described herein, a first cable with an In-Cable control box (IC-CPD) for connecting the charger to an alternating current terminal and a second cable for connecting the charger to a direct current charging socket of the motor vehicle.

In one embodiment, the second cable of the charging system comprises a Power Line Communication (PLC) and produces a connection to a controller of the motor vehicle, which is adapted to control a charging process of the HV battery of the motor vehicle. The PLC can be used for voice or data transmission, in order to make possible a communication with the controller. The controller can then identify the charging performance with which the charger can be operated, for example in order to release a current of suitable strength.

The benefits of the charger and charging system as described herein include the ability to dispense with a charger built into the motor vehicle in fixed manner, having a positive impact on the production costs of the motor vehicle, bring about a weight and design space reduction, and enabling enhanced charging performance. The AC charging performance can be exactly adapted and maintained, corresponding to the individual needs of the user. It is not necessary to purchase different AC chargers, but only to adapt the (accessory) power module, which can be designed in much more economical manner. Furthermore, this makes it possible for the charger to always keep up with the state of the art and to make available new functions, even for older vehicle models. Not least of all, it is advantageous that the charger can also be retrofitted in older vehicle models.

The portable charger moreover ensures a greater flexibility, since it can be used in different places. If the user wishes to carry along the external charger in their vehicle (such as on trips), they can decide in an entirely individual manner how many accessory modules to take along, for example in order to reduce the added weight in the vehicle or to create additional stowage space by connecting fewer power modules in the charger.

Since the motor vehicle no longer requires any alternating current charging socket or any built-in charging device with AC/DC converter, the construction of the motor vehicle itself is likewise simplified.

Further benefits and embodiments will emerge from the specification and the accompanying drawings.

Of course, the features mentioned above and those yet to be explained below can be used not only in the particular stated combination, but also in other combinations or standing alone, without leaving the scope of the present disclosure.

BRIEF DESCRIPTION OF THE SEVERAL VIEWS OF THE DRAWINGS

Embodiments of the invention are presented schematically with the aid of embodiments in the drawings and shall be further specified with reference to the drawings.

DETAILED DESCRIPTION

Figure 1:
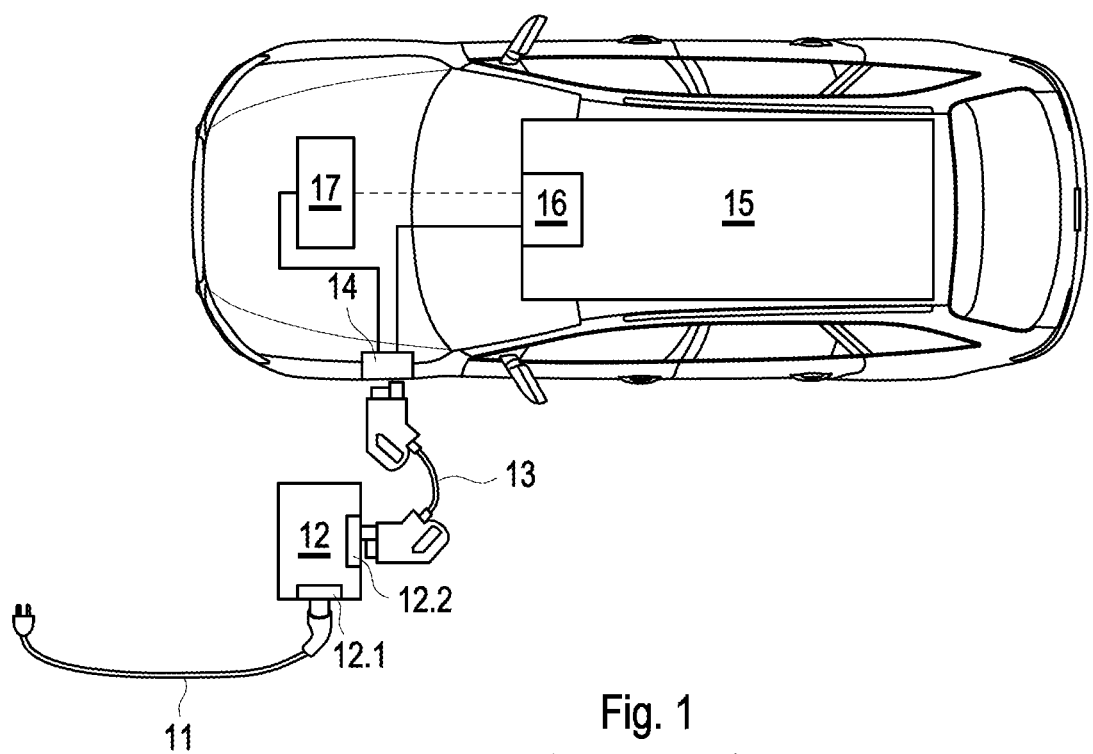
FIG. 1 illustrates an electric or hybrid vehicle having a charging device according to the prior art.

FIG. 1 shows in schematic representation an electric or hybrid vehicle having a charging device 12 according to the prior art.

An alternating current input 12.1 of the charging device 12 is connected across an alternating current cable 11 with In-Cable Control Box (In-Cable Control and Protecting Device, IC-CPD) to an alternating current source, such as the electricity grid. The charging device comprises a rectifier (AC/DC converter). A direct current output 12.2 of the charging device 12 is connected across a direct current cable 13 to a charging socket 14 (Combined Charging System, CCS) of the vehicle. The direct current is routed via a switch unit 16 of the battery management ("Battery Junction Box," BJB) to a HV battery 15 of the vehicle. The charging process is governed by the controller 17 (Electronic Control Unit, ECU) of the vehicle. The power pack of the charging device 12, in which the voltage conversion (AC/DC) takes place, is thus located outside the vehicle.

Figure 2:
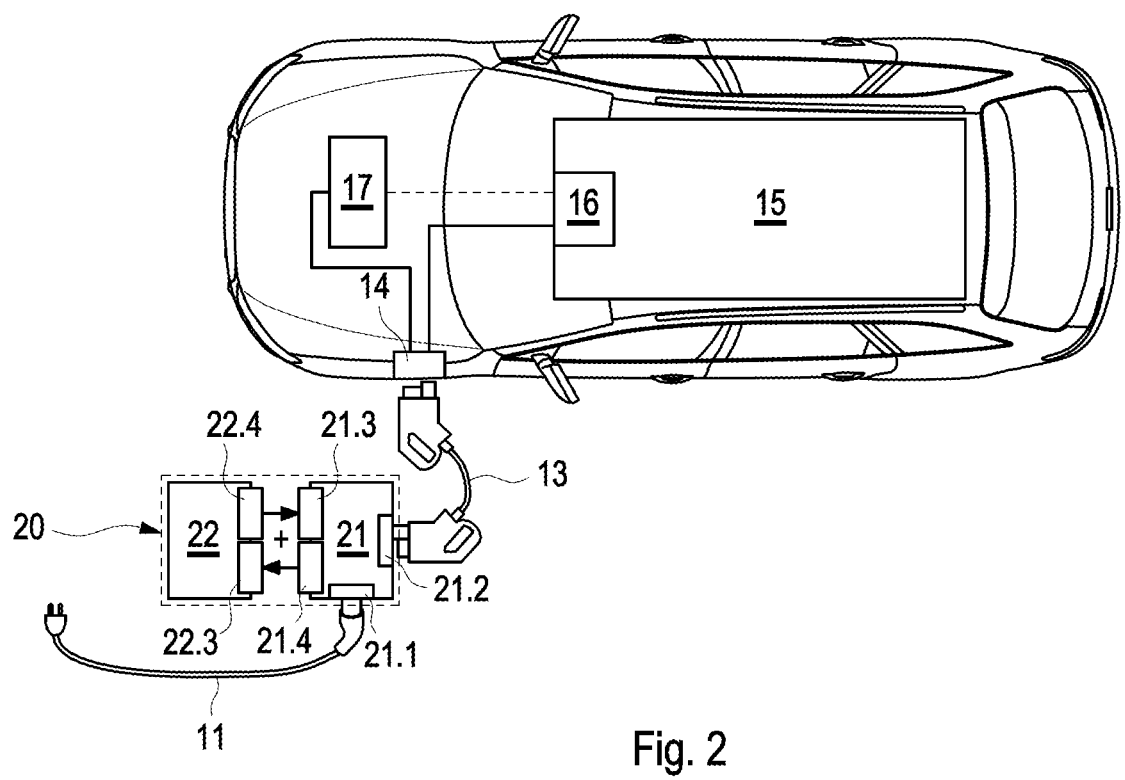
FIG. 2 illustrates an electric or hybrid vehicle having one embodiment of the charger as described herein.

FIG. 2 shows an electric or hybrid vehicle having one embodiment of the charger 20 as described herein, having a modular design. The portable external AC charger 20 comprises at least one primary or basic charger or module 21, containing a power stage with rectifier. An alternating current input 21.1 of the basic module 21 is connected across an alternating current cable 11 with IC-CPD to an alternating current source. A direct current output 21.2 of the basic module 21 is connected across a direct current cable 13 to a charging socket 14 (Combined Charging System, CCS) of the vehicle. The direct current is routed via a BJB 16 to a HV battery 15 of the vehicle. The charging process is governed by the controller 17 (ECU) of the vehicle. The basic module 21 additionally comprises an alternating current output 21.4 (AC output) and a direct current input 21.3 (DC input), by which it can be connected to one or more secondary or accessory modules 22. In the embodiment shown, the charger 20 comprises the basic module 21 and one accessory module 22. The alternating current output 21.4 of the basic module 21 is connected to an alternating current input 22.3 of the accessory module 22 and a direct current output 22.4 of the accessory module is connected to the direct current input 21.3 of the basic module 21.

As needed, further accessory modules 22, such as power stages, can be added quite individually and depending on the current needs. For example, given a maximum charging performance of 11 kW for the basic module 21, an expansion to 22 kW can be done by adding a further accessory module power stage 22 with AC/DC converter. Now, if such a basic module/accessory module assemblage 21, 22 is supplied with AC charging voltage from a charging point, the charging current will be divided between the two modules 21, 22, each of them transforming the alternating current into direct current. The accessory module 22 relays the transformed current back to the basic module 21, which then forms the sum current and relays this to the HV battery 15 of the vehicle.

Figure 3:
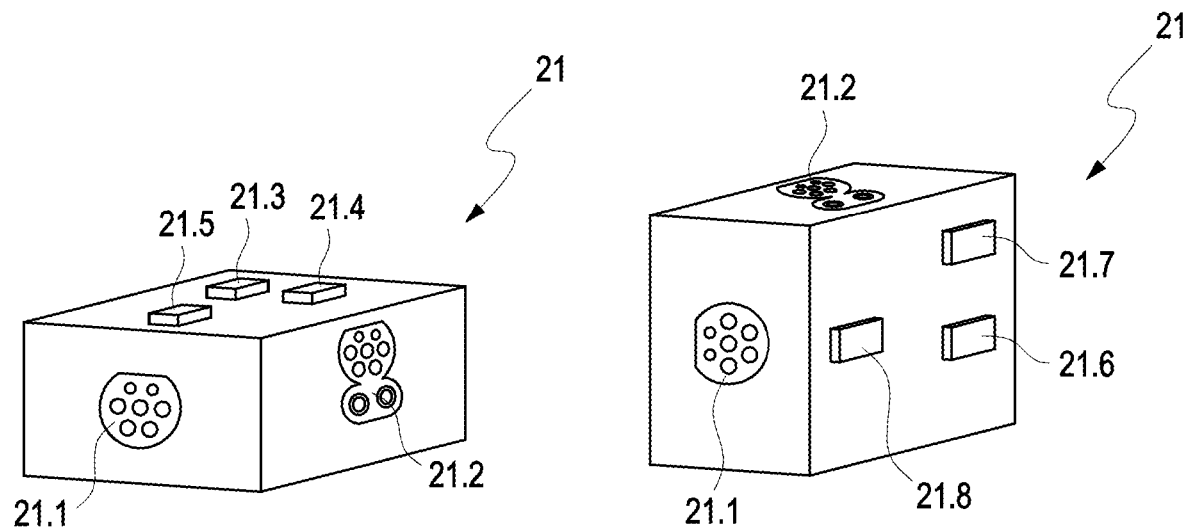
FIG. 3 illustrates two schematic perspective representations of one embodiment of a basic module of the charger as described herein.

FIG. 3 shows two schematic perspective views of one embodiment of a basic module 21 of the charger 20, one diagonal front view and one view in which the basic module 21 has been rotated 90° counterclockwise, i.e., lying on its side.

The basic module 21 is outfitted with an AC input 21.1 and a DC output 21.2. Moreover, for the contacting of an accessory module 22, it has a data interface 21.5, an AC output 21.4 and a DC input 21.3. For an operation in the vehicle (as an OBC), the basic module 21 in the embodiment shown is additionally provided with a further data interface 21.8, an AC input 21.7 and a DC output 21.6, for a contacting and integration directly in the onboard high voltage network of the vehicle. The terminals 21.6, 21.7 and 21.8 are optional and may be eliminated if the basic module 21 is not intended to be used as an OBC.

Figure 4:
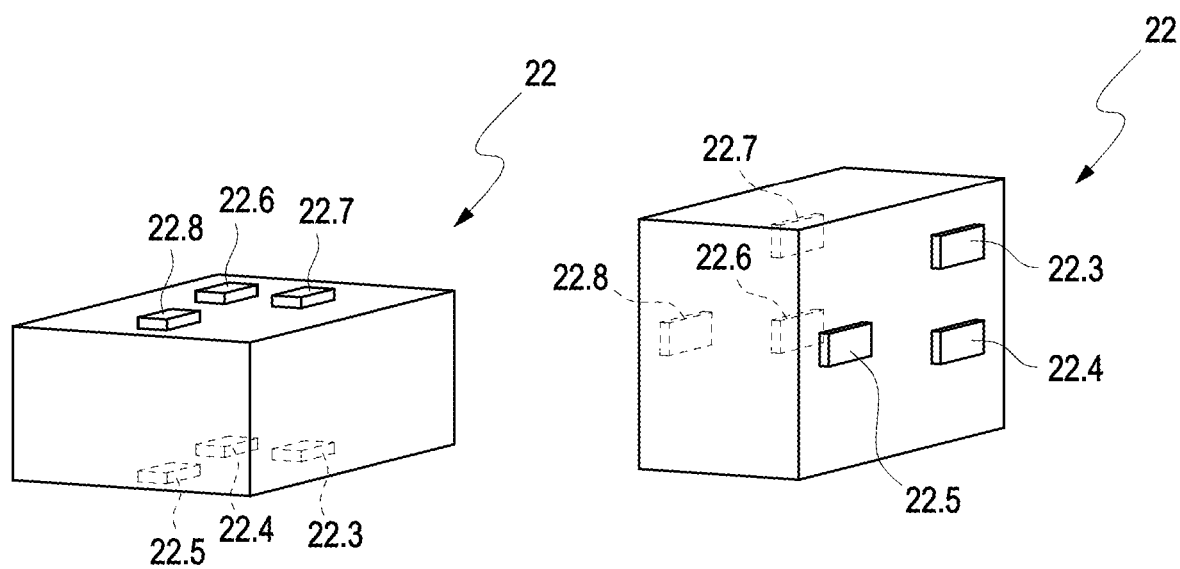
FIG. 4 illustrates two schematic perspective representations of one embodiment of an accessory module of the charger as described herein.

FIG. 4 shows two schematic perspective views of one embodiment of an accessory module 22 of the charger 20, one diagonal front view and one view in which the accessory module 22 has been rotated 90° counterclockwise, i.e., lying on its side.

The accessory module 22 has on its underside, as a complement to the basic module 21, plug connectors 22.3, 22.4, 22.5 which are complementary to the basic module, by which the basic module 21 and the accessory module 22 can be mechanically and electrically interconnected. The accessory module comprises an AC input 22.3, a DC output 22.4 and a data interface 22.5. In addition, further terminals 22.6, 22.7, 22.8 on the top side of the accessory module 22 allow the connecting of further accessory modules 22. An accessory module 22 here may represent not only a voltage converter, but also another functional expansion, such as a connectivity module for intelligent charging functions, or a HV battery ("power bank"), with which the charger 20 may function as an emergency power supply for the vehicle.

Figure 5:
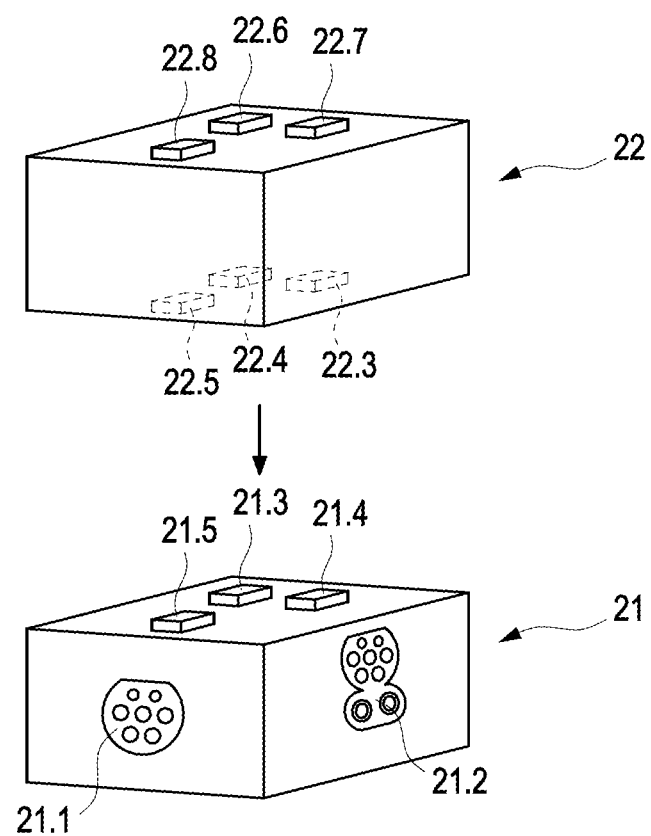
FIG. 5 illustrates an illustration of the combining of one embodiment of the charger from the basic module of FIG. 3 and the accessory module of FIG. 4.

FIG. 5 illustrates the combination of one embodiment of the charger 20 from a basic module 21 of FIG. 3 and an accessory module 22 from FIG. 4. The basic module 21 and accessory module 22 are joined together by a suitable plug and interlock technique so as to produce a unit which ensures a correct current and signal exchange, and the modules cannot be separated from each other.

German patent application no. DE 10 2020 113210.7, filed May 15, 2020, to which this application claims priority, is hereby incorporated herein by reference, in its entirety.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A portable external alternating current charger for a high-voltage battery of an electric or hybrid motor vehicle, having a modular design, comprising:
a basic module including a first alternating current input, a first direct current output, a first data interface, an alternating current output, and a direct current input,
wherein the first alternating current input, the first direct current output, the first data interface, the alternating current output, and the direct current input are accessible from outside of the basic module,
wherein the alternating current output, the direct current input, and the first data interface are on a first side of the basic module,
wherein the alternating current output is configured to connect to an alternating current input on a first side of an accessory module,
wherein the direct current input is configured to connect to a direct current output on the first side of the accessory module,
wherein the first data interface is configured to connect to a first data interface on the first side of the accessory module,
wherein the first alternating current input is on a second side of the basic module,
wherein the first direct current output is on a third side of the basic module, and
wherein the first side of the basic module, the second side of the basic module, and the third side of the basic module are different from each other.

2. The charger according to claim 1,
wherein the basic module additionally includes a second data interface, a second alternating current input, and a second direct current output,
wherein the second data interface, the second alternating current input, and the second direct current output are accessible from outside of the basic module,
wherein the second data interface, the second alternating current input, and the second direct current output are on a fourth side of the basic module, and
wherein the fourth side of the basic module is different from the first side of the basic module, the second side of the basic module, and the third side of the basic module.

3. The charger according to claim 2, wherein the first alternating current input is connectable to an alternating current terminal outside of the motor vehicle, and wherein the second alternating current input is connectable to a charging device inside of the motor vehicle.

4. The charger according to claim 1, further comprising the accessory module, wherein the accessory module includes the alternating current input, the direct current output, the first data interface, a direct current input, an alternating current output and a second data interface.

5. The charger according to claim 4 wherein the basic module and the accessory module are mechanically and electrically connected to each other by releasable plug connections.

6. The charger according to claim 4, wherein the accessory module includes a rectifier.

7. The charger according to claim 4, wherein the accessory module includes a high-voltage battery.

8. The charger according to claim 4, wherein the accessory module includes a connectivity module for intelligent charging functions.

9. The charger according to claim 1, further comprising a plurality of accessory modules, each of the accessory modules including an alternating current input, a direct current output, a first data interface, a direct current input, an alternating current output and a second data interface.

10. The charger according to claim 1, wherein the charger is a three-phase charger.

11. The charger according to claim 1, further comprising the accessory module, wherein, in operation, a charging voltage is provided to the alternating current input of the basic module and to the alternating current input of the accessory module, and wherein the accessory module, in operation, transforms an alternating current into a direct current and the direct current output of the accessory module outputs the direct current to the direct current input of the basic module.

12. A charging system for a high-voltage battery of an electric or hybrid motor vehicle, comprising:
a portable external alternating current charger having a modular design and a basic module including a first alternating current input, a first direct current output, a first data interface, an alternating current output and a direct current input,
wherein the first alternating current input, the first direct current output, the first data interface, the alternating current output, and the direct current input are accessible from outside of the basic module,
wherein the alternating current output, the direct current input, and the first data interface are on a first side of the basic module,
wherein the alternating current output is configured to connect to an alternating current input on a first side of an accessory module,
wherein the direct current input is configured to connect to a direct current output on the first side of the accessory module,
wherein the first data interface is configured to connect to a first data interface on the first side of the accessory module,
wherein the first alternating current input is on a second side of the basic module,
wherein the first direct current output is on a third side of the basic module, and
wherein the first side of the basic module, the second side of the basic module, and the third side of the basic module are different from each other;
a first cable with an In-Cable control box for connecting the charger to an alternating current terminal; and
a second cable for connecting the charger to a direct current charging socket of the motor vehicle.

13. The charging system according to claim 12, wherein the second cable includes a Power Line Communication and produces a connection to a controller of the motor vehicle, which is adapted to control a charging process of the high-voltage battery of the motor vehicle.

14. The charging system according to claim 12, wherein the basic module additionally includes a second data interface, a second alternating current input, and a second direct current output,
wherein the second data interface, the second alternating current input, and the second direct current output are accessible from outside of the basic module,
wherein the second data interface, the second alternating current input, and the second direct current output are on a fourth side of the basic module, and
wherein the fourth side of the basic module is different from the first side of the basic module, the second side of the basic module, and the third side of the basic module.

15. The charging system according to claim 14, wherein the first alternating current input is connectable to an alternating current terminal outside of the motor vehicle, and wherein the second alternating current input is connectable to a charging device inside of the motor vehicle.

16. The charging system according to claim 12, further comprising the accessory module, wherein, in operation, a charging voltage is provided to the alternating current input of the basic module and to the alternating current input of the accessory module, and wherein the accessory module, in operation, transforms an alternating current into a direct current and the direct current output of the accessory module outputs the direct current to the direct current input of the basic module.

* * * * *